United States Patent Office 3,632,601
Patented Jan. 4, 1972

3,632,601
ALKYL-1-MERCAPTO SUBSTITUTED-2-BENZIMIDAZOLE-CARBAMATES
Hein L. Klopping, Wilmington, Del., assignor to E. I. du Pont de Nemours and Company, Wilmington, Del.
No Drawing. Application Mar. 20, 1968, Ser. No. 714,462, now Patent No. 3,541,213, which is a continuation-in-part of application Ser. No. 629,900, Apr. 11, 1967, which in turn is a continuation-in-part of application Ser. No. 548,034, May 6, 1966. Divided and this application June 20, 1970, Ser. No. 56,645
Int. Cl. C07d 49/38
U.S. Cl. 260—309.2                 6 Claims

ABSTRACT OF THE DISCLOSURE

Alkyl-1-mercapto substituted - 2 - benzimidazolecarbamates of the formula below are useful as mite ovicides and fungicides.

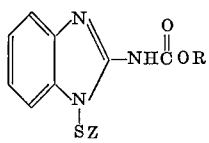

where R is methyl, ethyl, isopropyl as sec-butyl; and Z is alkyl of 1 through 3 carbon atoms, benzyl or derivatives thereof as defined hereinafter.

An exemplary species of this general class is the compound:
  methyl - 1 - (trichloromethylthio) - 2 - benzimidazolecarbamate.

CROSS REFERENCE TO RELATED APPLICATIONS

This application is a divisional of my copending application Ser. No. 714,462, filed Mar. 20, 1968, now U.S. Pat. 3,514,213, which application was a continuation-in-part of my then copending application Ser. No. 629,900, filed Apr. 11, 1967, now abandoned, which application was a continuation-in-part of my then copending application Ser. No. 548,034, filed May 6, 1966, now abandoned.

BACKGROUND OF THE INVENTION

This invention relates to mercapto substituted-2-benzimidazolecarbamates and to methods of using these compounds to prevent or mitigate damage to plants and inanimate organic materials by fungi and mites.

The survival of man has for a long time been dependent in a large measure upon his ability to protect from the various agents of destruction, plants and their products which satisfy his basic needs. With the rapidly increasing population of the world it becomes imperative that there be continuing great improvements in the efficiency of the materials and the methods employed to provide this protection. These improvements can be in the form of effective control of more kinds of pests or in the form of requiring less material or work. The materials and methods of this invention represent marked advances in both of these possible areas of improvement, as will be explained more fully.

I have discovered that application of the compounds of this invention by the methods of this invention, surprisingly, entirely precludes or reduces damage to plants and inanimate organic materials due to both fungi and mites. Fungus mycelia are killed or prevented from developing further by the presence of one or more of the compounds, i.e., the compounds are fungicidal or fungistatic. The compounds further prevent mite populations from expanding or reduce them to a low level or even eliminate them by preventing the normal hatching of their eggs, i.e., the compounds are mite ovicides.

The compounds and methods of this invention also make possible the control of damage by both fungi and mites with an amazingly small amount of chemical and with surprisingly little effort. These advantages are due in large measure to the fact that the compounds when properly applied, can enter and move about in plants. This means that an entire plant can be protected from mites and fungi with a simple application of the chemical to only a part of it, i.e., the compounds are systemic. Further, if the compounds are applied after a disease causing fungus is already established within a plant, they can enter the tissues and eradicate the infection, i.e., the compounds are curative. Thus, the need for applications prior to the actual incidence of the disease is eliminated under many circumstances.

SUMMARY OF THE INVENTION

It has been found that the above outstanding fungicidal and mite ovicidal activity can be obtained by applying to the locus of mite or fungus infestation, the compounds represented by the following formulas:

Formula I

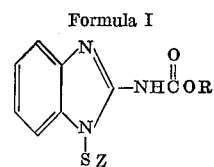

wherein

R is methyl, ethyl, isopropyl or sec-butyl; and
Z is alkyl of 1 through 3 carbon atoms; alkyl of 1 through 3 carbon atoms substituted with chlorine; phenyl; phenyl substituted with methyl, nitro, or chlorine; benzyl; or benzyl substituted with methyl, nitro or chlorine.

Preferred within Formula I on the basis of economics and ease of manufacture are compounds of the following formula:

Formula IA

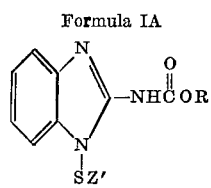

wherein

R is methyl, ethyl or isopropyl; and
Z' is trichloromethyl or 2,4-dinitrophenyl.

Most preferred within Formula I are the following compounds:

methyl-1-(trichloromethylthio)-2-benzimidazole-
  carbamate,
ethyl-1-(trichloromethylthio)-2-benzimidazole-
  carbamate,
methyl-1-(2,4-dinitrophenylthio)-2-benzimidazole-
  carbamate,
ethyl-1-(2,4-dinitrophenylthio)-2-benzimidazole-
  carbamate.

It will be understood that the compounds of this invention may exist in two tautomeric forms

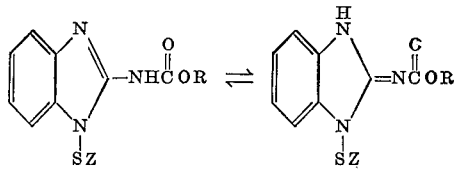

DETAILED DESCRIPTION OF THE INVENTION

The compounds of Formula I can be prepared by reacting a benzimidazole-2-carbamate with a sulfenyl chloride as shown in reaction schemes (1) and (2) below:

(1)
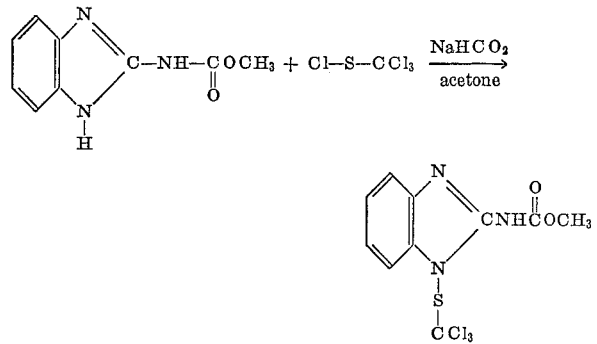

(2)
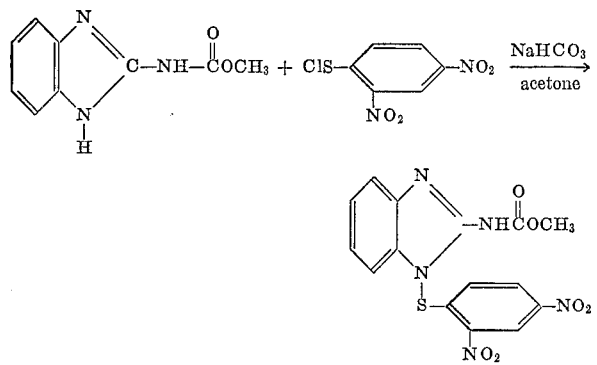

The reactions are generally run in an inert solvent such as chloroform, tetrahydrofuran or acetone at room temperature or at slightly elevated temperatures in the presence of suitable acid acceptors such as sodium bicarbonate or triethylamine.

The following examples are offered to illustrate the preparation of the compounds of Formula I. The amounts are given in terms of parts by weight unless otherwise specified.

EXAMPLE 1

To a mixture of 19 parts of methyl 2-benzimidazolecarbamate, 100 parts of chloroform, 9 parts of sodium bicarbonate and 10 parts of water, a total of 19 parts of trichloromethanesulfenyl chloride is added gradually with stirring. The reaction is maintained at room temperature with external cooling. The entire reaction is stirred for an additional hour at room temperature. The solid formed is removed by filtration, washed with two volumes of water and allowed to dry. This material amounts to 27 parts of essentially pure methyl-1-(trichloromethylthio)-2-benzimidazolecarbamate.

By using equivalent amounts of property substituted sulfenyl chlorides for the trichloromethanesulfenyl chloride and equivalent amounts of properly substituted mono- or disubstituted 2-aminobenzimidazoles for the methyl-2-benzimidazole-carbamate, the following compounds can be similarly made:

methyl-1-(methylthio)-2-benzimidazolecarbamate
methyl-1-(ethylthio)-2-benzimidazolecarbamate
methyl-1-(pentachloroethylthio)-2-benzimidazolecarbamate
methyl-1-(trifluoromethylthio)-2-benzimidazolecarbamate
methyl-1-(2,4-dinitrophenylthio)-2-benzimidazolecarbamate
ethyl-1-(2,4-dinitrophenylthio)-2-benzimidazolecarbamate
isopropyl-1-(o-nitrophenylthio)-2-benzimidazolecarbamate
isopropyl-1-(2,4-dinitrophenylthio)-2-benzimidazolecarbamate
ethyl-1-(trichloromethylthio)-2-benzimidazolecarbamate
isopropyl-1-(trichloromethylthio)-2-benzimidazolecarbamate
sec-butyl-1-(trichloromethylthio)-2-benzimidazole carbamate
methyl-1-(2,2,2-trifluoroethylthio)-2-benzimidazolecarbamate
methyl-1-(2-chloroethylthio)-2-benzimidazolecarbamate
methyl-1-(benzylthio)-2-benzimidazolecarbamate
methyl-1-(m-trifluoromethylphenyl)-2-benzimidazolecarbamate
ethyl-1-(pentafluoroethylthio)-2-benzimidazolecarbamate
ethyl-1-(2-fluoroethylthio)-2-benzimidazolecarbamate

EXAMPLE 2

A total of 20 parts of 2,4-dinitrophenylsulfenyl chloride is added gradually to a stirring mixture composed of 19 parts of methyl 2-benzimidazolecarbamate, 100 parts of chloroform, and 8 parts of pyridine. The reaction is stirred for an additional hour at room temperature upon completing the addition of the 2,4-dinitrophenylsulfenyl chloride. At this point, the solvent is removed under reduced pressure and the residue is washed with water and dried. The remaining solid is essentially pure methyl-1-(2,4 - dinitrophenylthio)-2-benzimidazolecarbamate.

By using equivalent amounts of properly substituted sulfenyl chlorides for the 2,4-dinitrophenyl sulfenyl chloride and equivalent amounts of properly substituted mono- or di-substituted 2-aminobenzimidazoles for the methyl 2-benzimidazolecarbamate, the following compounds can be similarly made:

methyl-1-(2,4-dichlorophenylthio)-2-benzimidazolecarbamate
methyl-1-(p-fluorophenylthio--2-benzimidazolecarbamate
methyl-1-(2,4-dimethylphenylthio)-2-benzimidalolecarbamate
methyl-1-(2,4-dinitrophenylthio)-2-benzimidazolecarbamate
methyl-1-(phenylthio)-2-benzimidazolecarbamate
sec-butyl-1-(o-methylphenylthio)-2-benzimidazolecarbamate
methyl-1-(3,4-dimethylphenylthio)-2-benzimidazolecarbamate
methyl-1-(o-nitrophenylthio)-2-benzimidazolecarbamate
methyl-1-(p-nitrophenylthio)-2-benzimidazolecarbamate
methyl-1-(3,4-dichlorophenylthio)-2-benzimidazolecarbamate
methyl-1-(benzylthio)-2-benzimidazolecarbamate
methyl-1-(o-methylbenzylthio)-2-benzimidazolecarbamate
methyl-1-(o-nitrobenzylthio)-2-benzimidazolecarbamate
methyl-1-(p-chlorobenzylthio)-2-benzimidazolecarbamate As mentioned previously, it has been found that the compounds of this invention possess outstanding fungicidal and mite ovicidal activity when employed to prevent or mitigate damage to plants and inanimate organic materials. A further aspect of this invention involves methods which when used in conjunction with the compounds of this invention, result in advances in mite and fungus control of great practical importance. A further advantage of the compounds of the invention is that they have a low order of mammalian toxicity. The paragraphs which follow describe in more detail the utility of this invention.

The compounds of the invention control a wide variety of fungus diseases of foliage, fruit, stems and roots of growing plants without damage to the host. Fruits, tubers, bulbs, roots, seeds and other plant parts harvested for food, animal feed or for other purposes are protected from fungus deterioration during processing, distribution and storage. Seeds, tubers, cuttings and other plant propagation materials are protected from fungus attack during handling and storage, as well as in the soil after planting. Wood, fabric, fiber board, paper and other industrial materials are protected from unsightly stain and destructive decay caused by fungi. Luggage, shoes, shower curtains, carpets, mats, clothing and other useful household, public or industrial items are protected from rot, fungus stains and mold growth.

The many fungi against which the compounds of this invention are active may be represented by, but is not intended to be limited to, the following: *Venturia inaequalis*, which causes apple scab; *Podosphaera leucotricha*, which causes powdery mildew on apple; *Uromyces phaseoli*, which causes bean rust; *Cercospora apii*, which causes early blight of celery; *Cercospora beticola*, which causes leaf spot of sugar beets; *Sclerotinia sclerotiorum*, which causes rot of vegetable crops, such as lettuce, beans, carrots, and celery; Coelltotrichum spp., which cause anthracnose of fruits and vegetables, such as beans, tomatoes and coffee; *Septoria apii*, which causes late blight of celery; *Cercospora musae*, which causes Sigotoka disease of banana; Piricularia sp., which causes Johnson spot on banana; *Erysiphe cichoracaerum*, which causes powdery mildew on cantaloupe and other cucurbit crops; *Penicillium digitatum*, Phomopsis spp., and *Diplodia natalensis*, which cause fruit rots on citrus; *Ceratostomella ulmi*, which causes Dutch elm disease; *Sphaerotheca humuli*, which causes powdery mildew on roses; *Diplocarpon rosae*, which causes black spot on roses; Ramularia sp., which causes leaf spots on ornamental plants; *Botrytis cinerea*, which causes blossom and fruit rots of ornamentals, fruits and vegetables; *Uncinula necator*, which causes powdery mildew on grapes; *Guignardia bidwellii* which causes grape black rot; *Melonconium fuligineum*, which causes white rot of grapes; *Coccomyces hiemalis*, which causes cherry leaf spot; Cytospora sp., which cause cankers of trees; *Cladosporium carpophilum*, which causes peach scab; *Fusicladium effusum*, which causes pecan scab; *Erysiphe graminis*, which causes powdery mildew on cereals; *Monolinia (Sclerotinia) laxa* and *M. fructicola*, which cause brown rot of stone fruits, such as peaches, cherries and apricots; *Pseudopeziza ribes*, which causes leaf spot on gooseberry; *Piricularia oryzae*, which causes rice blast; *Puccinia recondita*, *P. coronata* and *P. glumarum*, which cause leaf rusts of wheat, oats and grasses, respectively; *Puccinia graminis tritici*, which causes stem rust of wheat; *Claviceps purprea*, which causes ergot of rye and grasses; *Aspergillus niger*, which causes cotton boll rot as well as decay following wounding in many plant tissues; *Aspergillus flavus*, which causes mold growth on peanuts, as well as on other food and feed materials; *Aspergillus terreus*, which is common in soil and attacks vegetable matter; *Tilletia caries* and other Tilletia species, which cause common bunt of wheat; *Ustilago tritici*, *Ustilago nigra*, *Ustilago avena* (and other Ustilago species), which cause loose smut of wheat, barley, and oats, respectively; *Urocystis tritici* and other Urocystis species, which cause loose smut of wheat; *Sphacelotheca sorghi*, which causes covered smut of sorghum; *Ustilago hordei* and *Ustilago kolleri*, which cause covered smut of barley and oats, respectively; *Pithomyces chartorum*, which is present in turf, pastures, and other grassy areas and is known to have several secondary effects; *Gloeodes pomigena*, which causes sooty blotch on apples; *Physalospora obtusa*, which causes black rot on apples; *Microthyriella rubi*, which causes flyspeck on apples; various species of Rhizoctonia, Fusarium and Verticillium present in soil and attacking the roots or other underground parts and the vascular system of a variety of plants; various species of Penicillium growing on such things as fabric, fiber board, leather goods and paint; species of Myrothecium attacking such items as shower curtains, carpets, mats and clothing.

The mite ovicidal action of the compounds of this invention is useful in preventing the development of damaging populations of mites or in causing the gradual reduction of existing populations. The movement of mites is limited. Thus, an increase in population or the continuation of a high population in a particular locus depends largely upon the hatching of eggs laid in that locus.

Mite eggs do not hatch to produce living young if these eggs are treated with one of these compounds, or if they are laid on a surface containing one of these compounds. Further, the eggs will not hatch if they are laid by a female mite that has been in contact with one of these compounds, or are laid by a female mite that is ingesting or has recently ingested food such as plant juices containing one of these compounds. This interference with the hatching of eggs prevents the population from increasing significantly beyond that present at the time of treatment. Also, this ovicidal action, along with the high natural mortality of adults, can largely eliminate mites from an already infested area over a relatively short period of time. Further, as long as the compounds are present on the surface the mites occupy or remain in their food supply, new populations cannot develop.

Many species of mites which cause damage to fruits, field crops, vegetables, and ornamentals under a wide variety of circumstances, are controlled by the compounds and methods of this invention. The extent of the practical utility of the mite control obtained is represented by, but is not intended to be limited to, the following listing of specific susceptible mites along with the types of damage that they can cause: *Panonychus ulmi* (European red mite) and *Tetranychus telarius* (two-spotted mite) which are commonly called "orchard mites"; these mites attack a great many deciduous tree fruits including apples, pears, cherries, plums and peaches; *Tetranychus atlanticus* (Atlantic or strawberry mite), *T. cinnabarinus* (carmine spider mite) and *T. pacificus* (Pacific mite); these mites attack cotton and numerous other crop plants; *Paratetranychus citri* (citrus red mite) and others which attack citrus; *Phyllocoptruta aleivora* which causes citrus rust; *Bryobia praetiosa* (clover mite) which attacks clover, alfalfa and other crops; *Phyllocoptruta oleivora*, the citrus rust mite; *Acreia neocynodomis* which attacks grasses and other plants; *Tyrophagus lintneri* which is a serious pest in stored foods and on cultivated mushrooms and *Lepidoglyphus destructor* which injures Kentucky bluegrass seed in storage.

The compounds of this invention when applied by certain of the methods of this invention enter and move freely within plants, i.e., they are systemic. Thus both fungi and mites can be controlled in plants in parts well removed from the point of application. In view of this activity the compounds can be applied to seeds; thus the treatment of cucumber seeds with a few grams per 50 kilograms of seed of a compound of this invention provides control of powdery mildew (*Erysiphe cichoracearum*) and spider mites such as *Tetranychus urticae* on the resulting plants for periods in excess of 40 days. Application to soil also provides control of certain foliage diseases and mites on plants growing in the treated soil. Spray or dust treatments of plant foliage and stems impart protection against both fungi and mites to other parts of the plant not actually sprayed and to new foliage developing later.

There are important practical advantages associated with the use of an effective systemic pesticide. Thus, successful application to seed as described, results in great savings in chemical and application costs. Soil application which effectively protect entire plants for an extended period also represent similar savings. Distribution within the plant following foliage treatment eliminates the need for frequent retreatment to protect rapidly growing tissue. Also, materials within the plant are not subject to removal by rainfall. Similarly, movement or translocation of the chemical within the plant can provide protection to those parts of the plant that may not have been covered by the original spray application. This is of particular importance with plants of dense growth character resisting the intrusion of the spray and also to tall plants, such as shade trees, where the spray will not reach to the top.

An additional valuable characteristic of the compounds of this invention is their ability to prevent the spread or to kill fungus infection already established within a plant, i.e. they are curative. Thus, the compounds need not be applied until after conditions develop which permit the actual initiation of fungus attack. This means that, under some circumstances, it is possible to avoid applying any chemical during the entire life of the crop. In other cases, only a part of the normal full schedule of pesticide is required.

Therefore great savings both in chemical cost and application labor are possible with compounds capable of systemic and curative performance. Another saving is afforded by the compounds of this invention through the fact that both fungi and mites are controlled by applications of a single chemical.

The compounds of this invention provide protection from damage caused by fungi, mites or both when applied to the proper locus by the methods described hereinafter and at a sufficient rate to exert the desired fungicidal and mite ovicidal effect. They are especially suited for the protection of living plants such as fruit-bearing trees, nut-bearing trees, ornamental trees, forest trees, vegetable crops, horticultural crops (including ornamentals, small fruits and berries), fiber crops, grain and seed crops, sugarcane, sugar beets, pineapple, forage and hay crops, beans, peas, soybeans, peanuts, potatoes, sweetpotatoes, tobacco, hops, turf and pasture.

Living plants may be protected from fungi and mites by applying one or more of the compounds of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solution. Preferred rates for application of the compounds of this invention to soil in which plants are or will be growing range from 0.01 to 500 parts per million by weight of the soil in which the roots are or will be growing. More preferred use rates are in the range of 0.1 to 50 parts per million, and the most preferred rates are in the range of 0.25 to 25 parts per million.

Preferred rates for application to seeds, tubers, bulbs or other plant reproductive parts, range from 0.03 to 6000 grams of active compound of this invention per 50 kilograms of planting material treated. More preferred rates are in the range of 0.3 to 3000 grams of active compound per 50 kilograms. The most preferred rates are in the range of 2.8 to 1500 grams per 50 kilograms.

Applications are made from dusts, slurries or solutions. Such treatments protect the treated parts themselves from damage due to fungi, mites, or both, and in addition, impart extended protection against both types of pests to the resulting new plants.

Preferred rates for application of the compounds of this invention to foliage, stems and fruit of living plants range from 0.012 to 60 kilograms of active ingredient per hectare. More preferred rates are in the range of 0.025 to 30 kilograms per hectare and the most preferred rates are in the range of 0.05 to 15 kilograms per hectare. The optimum amount within this range depends upon a number of variables which are well known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days. Applications are made from dusts, slurries or solutions.

Preferred rates for dip applications to roots of living plants are in the range of 0.5 to 18,000 grams of active ingredient per 380 liters of water or other liquid carrier. More preferred rates are in the range of 4.5 to 9,000 grams per 380 liters and the most preferred rates are in the range of 45 to 4500 grams per 380 liters.

Preferred rates for injection into the roots or stems of living plants are in the range of 0.01 to 10,000 parts per million of water or other liquid carrier. More preferred rates are in the range of 0.1 to 5,000 parts per million. The most preferred rates are in the range of 1 to 1,000 parts per million.

Plant parts such as fruits, tubers, bulbs, foliage roots and the like, harvested for food or feed, are protected from decay and other deterioration caused by fungi or mites during processing, distribution and storage by treatment with an active compound of this invention. The plant parts to be so protected can be dipped in a liquid bath containing the active ingredient, dusted with a finely divided preparation of the active ingredient, sprayed, misted with an aerosol containing the compound, or enclosed in wrapping or packing materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active ingredient. More preferred rates are in the range of 0.1 to 5% and the most preferred rates are in the range of 0.2 to 2.5%.

Damage by mites to stored organic products such as grain, seed, bulbs, tubers, meat or animal hides is kept to a minimum by treating the floors, walls, portions, and other parts of warehouses or other structures with one or more of the active compounds. Applications are made by the use of dusts, sprays, or aerosols with preferred use rates in the range of 0.05 to 1000 grams of the active compound of this invention per 93 square meters of surface to be kept free of excessive mite populations.

As was previously set forth, the compounds of this invention are especially suited for use on living plants. Application to the foliage, stems and fruit of plants at the rate indicated above is generally accomplished by employing sprays, dusts or aerosols containing the proper amount of active ingredient. For the control of mites and fungi which are regularly present, applications often start prior to the time that the problem actually appears and continue on a pre-determined schedule. Such a procedure is termed "preventive" or "protective."

With the compounds of this invention, successful control of plant diseases can also be accomplished by applications made after they are present. Fungus mycelia within the plant tissue are actually killed. This approach or effect is termed "curative" or "eradicant" and permits the user to realize considerable savings.

Curative control of plant diseases with the compounds of this invention is enhanced if the treated plant parts are moist for one or more periods of 2 to 12 hours each soon after the active compound is applied. Often the slow drying of an original spray treatment or naturally occurring rains, mists, fogs or dews will accomplish this. Under other circumstances, such as during dry periods or in shelters such as greenhouses, it is necessary to keep the plants moist by some special effort for best results.

When the compounds of this invention are applied, their activity can be enhanced by using certain adjuvants, for example in the water in which the benzimidazole fungicides are dispersed. These adjuvants may be surface active agents, oils, humectants, enzymes, carbohydrates, and organic acids. They improve the performance on tubers, on foliage, in treatments used for dip application to roots of living plants, in the case of liquids used for injection into the roots or stems of living plants, or in mixtures used to treat fruits, tubers, bulbs, roots, and the like, after harvest.

Surface active agents that enhance fungus control and mite control by the compounds of this invention include sulfonated and sulfated amines and amides, diphenyl sulfonate derivatives, ethoxylated alcohols, ethoxylated alkylphenols, ethoxylated fatty acids, ethoxylated fatty esters and oils, polyethylene oxide/polypropylene oxide combinations, alkylsulfonates, fluorocarbon surfactants, glycerol esters, ethoxylated alcohol sulfates, glycol esters, isethionates, sulfated ethoxylated alkylphenols, lanolin derivatives, lecithin and lecithin derivatives, alkanol amides, phosphate derivatives, monoglycerides and derivatives, quaternaries, sorbitan and sorbitol derivatives, sulfosuccinates, alcohol sulfates, sulfated fatty esters, sulfated and sulfonated oils and fatty acids, alkylbenzene sulfonates, imidazolines, taurates, ethoxylated mercaptans, ethoxylated amines and amides, modified phthalic glycerol alkyd resins, and similar materials. The oils include nonphytotoxic aliphatic spray oils and triglycerides, either with or without emulsifier to permit dispersion in water. Humectants such as glycerin or ethylene glycols, enzymes such as bromelin, and carbohydrates such as glucose, lactose, and dextrose are also useful. Organic acids of interest include glycolic and gluconic acids. Although the precise manner in which these additives improve the performance of the fungicides of this invention is not known, the effect is, nevertheless, startling, and it is possible that these additives improve the penetration into the plant or translocation throughout the plant of the fungicides of this invention.

Preferred surface active agents to improve the fungicidal and mite ovicidal activity of these compounds are products such as dioctyl sodium sulfosuccinates ("Aerosol" OT and "Aerosol" OT–B), blends of aromatic sulfonates and ethylene oxide derivatives ("Agrimul" GM, "Agrimul" A–100, "Agrimul" N–100, "Emcol" H50A, "Emcol" H53), polyoxyethylene sorbitol oleate/laurate ("Atlox" 1045A), sodium lauryl sulfate ("Duponol" ME), polyoxyethylated vegetable oils ("Emulphor" EL719), lecithin derivatives ("Emultex" R), acidic complex organic phosphate esters ("Gafac" RE–610, "Victawet"), aliphatic amide alkyl sulfonates ("Hyfoam" Base LL), oleic acid esters of sodium isethionate ("Igepon" AP78), sodium N-methyl-N-oleoyl taurate ("Igepon" T77), sodium salt of sulfated lauryl and myristyl colamide ("Intramine" Y), polyethylene glycol 400 oleic acid esters ("Nonisol" 210), sodium dodecylbenzene sulfonates ("Sul-Fon-Ate" AA 10, "Ultrawet" K), polyoxyethylene ethers with long-chain alcohols ("Surfonic" LR 30, "Alfonic" 1012–6, "Brij" 30, "Tergitol" TMN), ethylene oxide condensates with propylene oxide/ethylene diamine condensates ("Tetronic" 504), polyhydric alcohol esters ("Trem" 014), modified phthalic glycerol alkyd resins ("Triton" B 1956), quaternaries ("Zelec" DP), alkylphenol ethylene oxide condensates ("Dowfax" 9N4, "Dowfax" 9N10, "Hyonic" 9510, "Tergitols") and the like. Examples given in parentheses are illustrative and do not exclude other unnamed commercial products. Examples of other surface active agents in each of these several categories are listed in "Detergents and Emulsifiers," 1965 Annual, or 1966 Annual, published by John W. McCutcheon Inc., 236 Mt. Kemble Ave., Morristown, N. J.

Preferred oils include spray oils such as "Orchex" 796 made emulsifiable with "Trition" X–45, castor oil made emulsifiable with "Trition" X–114, corn oil made emulsifiable with "Triton" X–114, Volck Oil #70, Sunoco Oil No. 7E and similar nonphytotoxic spray oils of vegetable, animal or mineral origin.

The preferred rates for these surfactants when used in sprays is in the range from 10 to 10,000 parts per million of the spray fluid. More preferred rates are in the range of 30 to 3,000 parts per million and the most preferred rates are in the range of 100 to 1,000 parts per million.

For dusts, the preferred surfactant rates are in the range of 1,000 to 300,000 parts per million of the material actually applied. More preferred rates are in the range of 5,000 to 200,000 parts per million with the most preferred rates being in the range of 10,000 to 100,000 parts per million.

As previously mentioned, the compounds of the invention are systemic. For systemic applications to above-ground parts, such as foliage, stems and fruit, the presence of a surface-active agent in the spray or dust enhances activity. Use rates for the surface active agent here are the same as for sprays and dusts for preventive or curative control as discussed above. Systemic effect from the treatment of above-ground parts is also enhanced by moisture on the treated surfaces for one or more periods of 2 to 12 hours each.

Systemic control of both mites and fungi on plants is also accomplished by applications to seeds, tubers, bulbs or other reproductive parts prior to planting as well as by application of the chemical to the soil in which the plants to be protected are, or will be, growing. Application to reproductive parts prior to planting is effected through the use of sprays, dips, dusts or aerosols containing one or more of the compounds of this invention. Treatment of soil is accomplished by physical mixing prior to planting, distribution in the furrow at planting time, application in transplant water, placement in the soil in a band or sheet with specialized equipment, injection through irrigation water or by distribution on the field surface.

The fungicidal and mite ovicidal compositions of the invention contain in sufficient amount to exert fungicidal or mite ovicidal action, one or more compounds of this invention in admixture with a carrier material or conditioning agent of the kind used and commonly referred to in the art as an adjuvant or modifier. The general classes of adjuvants applicable to the compounds of this invention are inert solids, organic liquid solvents, organic liquid or aqueous diluents and surface-active agents. Formulations adapted for ready and efficient application using conventional applicator equipment are prepared by compounding the compounds of this invention with suitable adjucants by mixing, grinding, stirring or other conventional processes. Normally the active ingredient composes 1–95% by weight of the fungicidal or mite ovicidal composition.

Solid compositions can be in the form of water-dispersible powders, dusts, pellets and granules. Water-dispersible powders are particularly useful and can be prepared by simple mixing and grinding steps and can be either used as such, diluted with inert solids to form dusts or granules, or suspended in a suitable liquid medium for spray or seed treatment application. The powders usually comprise active ingredient admixed with varying amounts of conditioning agents, surface-active agents and stabilizers. The classes of extenders suitable for the wettable powders of this invention are clays such as the kaolins, diatomaceous earths, calcium carbonates, sulfur, sodium sulfate, and also synthetic silicas and silicates. Diluents that have been surface reacted, such as organic acid coated calcium carbonate, can also be used. Diluents of organic origin such as walnut shell flour, lignin sulfonate, corn cob flour, or carbohydrates can also be used. In addition, natural or synthetic frangible resins can be used.

Among the preferred diluents are coated calcium carbonate, corn cob flour, starch, sucrose, sulfur, sodium sulfate and partially desulfonated sodium lignin sulfonate.

It is also preferred that the diluents be used in an anhydrous state.

The active ingredient usually makes up from about 25-90% of these wettable powder compositions. These wettable powders can also be converted to dusts containing 1-25% of active material by mixing or grinding with one or more of the diluents listed above, or with pyrophyllite, volcanic ash and other dense, rapid-settling inert solids. Alternatively, dusts can be prepared by grinding the dust diluents with the active ingredient, or by preparing dust concentrates for further dilution. These dust concentrates can contain from 80-95% of the active ingredient, blended and ground with diluents and, if desired, small amounts of surface active agents.

For the granule compositions of this invention, the most suitable carriers are of two types. The first are porous, absorptive, preformed granules, such as preformed and screened granular clays, heat expanded granular screened vermiculite, or granular botanicals. On any of these, a solution or aqueous or nonaqueous suspension of the active agent can be sprayed at concentrations up to 25 weight percent of the total weight. In addition to the active component, the solutions or suspensions can contain surfactant and also binders such as sucrose or swollen starch to aid in adhering small particles of dispersed product to the dried granules. Such adhesive materials may also be surfactants and include such products as polyvinyl alcohol, calcium and magnesium lignin sulfonate in admixture with wood sugars, acrylate and asphalt emulsions, abietates, etc. Oils or other non-volatile liquids like glycols can also be used to improve adhesion.

The second suitable type of carrier is the powdered kaolinitic clays, or bentonitic clays in the sodium, calcium or magnesium forms. These clays are blended with the active components and optionally surfactants to give mixtures that are granulated and dried to yield granular material with the active component distributed uniformly throughout the mass. Other suitable diluents for granulation are sulfur, organic dusts such as corn cob flour, starch, dextrin, sucrose, in conjunction with binders and surfactants. Such granules can also be made with 25 to 30 weight percent active component, but more frequently a concentration of about 10 weight percent is desired for optimum distribution. Similar compositions can be made by extruding the mixture in the presence of moisture or other liquids such as polyethylene glycols and converting the extrusions into granules or pellets by a suitable combination of cutting, drying, and crushing steps. The granular compositions of this invention are most useful in a size range of 15-60 mesh (approx. 0.25-1.3 mm.).

Liquid compositions employing one or more of the active compounds of this invention are prepared by admixing the active ingredient with a suitable liquid diluent medium. The active ingredient can be either in solution or in suspension in the liquid medium. Typical of the liquid media which can be used are water, paraffinic spray oils, alkylated naphthalenes, xylene, alcohols, chlorinated hydrocarbons and ketones. The active ingredient usually makes up from about 0.5 to 50% of these liquid compositions. In addition, surface-active agents, particularly emulsifiers, can be present to aid in the suspension or dispersion or to emulsify the composition into water.

Compositions of the invention, especially liquids and wettable powders, contain as a conditioning agent one or more surface-active agents in amounts sufficient to render a given composition readily dispersible in water or in oil. By the term "surface-active agent," it is understood that wetting agents, dispersing agents, suspending agents and emulsifying agents are included.

Suitable surface-active agents include anionic, cationic, and non-ionic types. In general, less than 10% by weight of the surface-active agent is present in the compositions of this invention, although frequently the amount of surface-active agent in these compositions is less than 2% by weight.

Preferred wetting agents are alkylbenzene- and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, sodium, calcium, and magnesium lignin sulfonates, polymeric alkylnaphthalene sulfonates, sodium naphthalene sulfonate, polyvinylpyrrolidone derivatives, polymethylene bisnaphthalenesulfonate and sodium N-methyl-N-(long chain acid taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender can be replaced by a corrosion inhibitor or an antifoaming agent, or both. In some instances, it may be advantageous to use larger amounts of dispersants such as the lignin sulfonates in wettable powder, pellet, granule and dust compositions. In such a case, the lignin sulfonates additionally act as diluents for powders and as binder for granules and pellets.

Emulsifying agents most suitable for the liquid compositions of this invention are alkylaryl polyethoxy alcohols, condensation products of ethylene oxide with long-chain alkyl alcohols, mercaptans or amines, sorbitan fatty acid esters, polyethylene glycol fatty esters, fatty alkylol amide condensates, amine salts of fatty alcohol sulfates, and oil soluble salts of petroleum sulfonates. Mixtures of emulsifying agents are often preferred. Such emulsifying agents will comprise from about 3 to 10 weight percent of the total composition. As described above, however, much greater amounts of emulsifying agent can be used to give improved results.

The compounds of this invention and the oils, humectants, enzymes, carbohydrates, and acids useful to enhance the fungicidal and mite-ovicidal activity of these compounds can be brought together in several ways. For example, the additive which will enhance activity can be mixed with compounds of the invention when spray slurries are being prepared. It is often also possible and convenient to produce formulations in which the additive and the compound of the invention will both be present in the composition, which is then convenient to apply. Such compositions can be powders, granules, suspensions, or even solutions, depending upon the physical and chemical characteristics of the components that are to be prepared. It will be readily understood by those skilled in the trade and in the light of the above teachings that the ratios of active ingredients compound to additives may vary widely. Thus, the additive may be present in such mixtures within the range of from 33 to 10,000 parts per 100 parts of the compounds of this invention. More preferred are rates of from 40 to 5,000 parts of additives per 100 parts of active ingredients and a range of ratios from 50 to 3,500 per 100 parts of compound is even more preferred.

Among non-ionic and anionic surfactants, those most suitable for the preparation of the dry, wettable products of this invention are solid forms of compounds known to the art as wetters and dispersants. Occasionally a liquid, non-ionic compounds classified primarily as an emulsifier can serve as both wetter and dispersant.

Such compositions can contain, in addition to the active ingredients of this invention, conventional insecticides, miticides, bactericides, nematocides, fungicides, or other agricultural chemicals such as fruit set agents, fruit thinning compounds, fertilizer ingredients and the like, so that the compositions can serve useful purposes in addition to the control of fungi and mite infestations.

The following are illustrative of the agricultural chemicals that can be included in the compositions or, additionally, that may be added to sprays containing one or more of the active compounds.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane (lindane);
2,3,4,5,6,7,8,8-octachloro-4,7-methano-3a-4,7,7a-tetrahydroindane;
1,2,3,4,10,10-hexachloro-6,7-epoxy-1,4,4a-5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1 (or 3a), 4,5,6,6,8,8-heptachloro-3a-4,7,7a-tetrahydro-4,7-methanoindene;
1,1,1-trichloro-2,2-bis(p-methoxyphenyl)ethane (methoxychlor);
1,1-dichloro-2,2-bis(p-chlorophenyl)ethane;
chlorinated camphene having a chlorine content of 67–69%;
2-nitro-1,1-bis(p-chlorophenyl)butane;
1-naphthyl-N-methylcarbamate (carbaryl);
methylcarbamic acid, ester with phenyl, 4-(dimethylamino)-3,5-dimethyl;
methylcarbamic acid, ester with 1,3-dithiolan-2-one oxime;
O,O-diethyl-O-(2-isopropyl-4-methylpyrimid-6-yl) thiophosphate;
O,O-dimethyl-1-hydroxy-2,2,2-trichloroethyl phosphonate (diazinon);
O,O-dimethyl-S-(1,2-dicarbethoxyethyl)dithiophosphate (malathion);
O,O-dimethyl-O-p-nitrophenyl thiophosphate (methyl parathion);
O,O-dimethyl-O-(3-chloro-4-nitrophenyl)thiophosphate;
O,O-diethyl-O-p-nitrophenyl thiophosphate (parathion);
di-2-cyclopentenyl-4-hydroxy-3-methyl-2-cyclopenten-1-one chrysanthemumate;
O,O-dimethyl-O-(2,2-dichlorovinyl)phosphate (dichlorovos);
mixture containing 53.3% "Bulan," 26.7% "Prolan" and 20.0% related compounds;
O,O-dimethyl-O-(2,4,5-trichlorophenyl)phosphorothioate;
O,O-dimethyl-S-(4-oxo-1,2,3-benzotriazine-3(4H)-yl-methyl)-phosphorodithioate (azinphosmethyl);
bis(dimethylamino)phosphonous anhydride;
O,O-diethyl-O-(2-keto-4-methyl-7-a'-pyranyl)thiophosphate;
O,O-diethyl (S-ethyl mercaptomethyl)dithiophosphate;
calcium arsenate;
sodium aluminofluoride;
dibasic lead arsenate;
2'-chloroethyl-1-methyl-2-(p-tert-butylphenoxy)ethyl sulfite;
azobenzene;
ethyl 2-hydroxy-2,2-bis(4-chlorophenyl)acetate;
O,O-diethyl-O-(2-ethylmercapto)-ethyl thiophosphate (demeton);
2,4-dinitro-6-sec-butyl phenol;
toxaphene;
O-ethyl-O-p-nitrophenylbenzenethiophosphonate (EPN);
4-chlorophenyl-4-chlorobenzene sulfonate;
p-chlorophenyl-phenyl sulfone;
tetraethyl pyrophosphate (TEPP);
1,1-bis(p-chlorophenyl)ethanol;
1,1-bis(chlorophenyl)-2,2,2-trichloroethanol (dicofol);
p-chlorophenyl-p-chlorobenzyl sulfide;
bis(p-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
methyl-2-(o-hydroxyphenyl)-1,3-dithiolane carbamate;
methyl-2-(o-hydroxylphenyl)-1,3-dioxolane carbamate;
dl-2-allyl-4-hydroxy-3-methyl-2-cyclopenten-1-one esterified with a mixture of cis and trans dl-chrysanthemum monocarboxylic acids;
butoxypolypropylene glycol;
ethyl 2-hydroxy-2,2-bis(4-chlorophenyl)acetate (chlorobenzilate);
p-dichlorobenzene;
2-butoxy-2'-thiocyanodiethyl ether;
naphthalene;
methyl O-carbamylthiolacetohydroxamate;
1,1-dichloro-2,2-bis(p-ethylphenyl)ethane;
methyl O-(methylcarbamoyl)thiolacetohydroxamate (methomyl);
5-methyl 1-dimethylcarbamoyl-N-[(methylcarbamoyl)oxy]thioformimidate;
p-dimethylaminobenzenediazo sodium sulfonate;
2-heptadecylimidazoline acetate (glyodin);
quinone oxyaminobenzooxohydrazone;
tetraalkyl thiuram disulfides such as tetramethyl thiuram disulfide or tetraethyl thiuram disulfide;
metal salts of ethylene bisdithiocarbamic acid, e.g. manganese, zinc, iron and sodium salts;
pentachloronitrobenzene;
2-(1-methylheptyl)-4,6-dinitrophenyl crotonate and other nitrophenol derivatives;
N-dodecylguanidine acetate (dodine);
N-(trichloromethylthio)phthalimide;
N-trichloromethylthiotetrahydrophthalimide (captan);
cis-N-[1,1,2,2-tetrachloro ethyl)thio]-4-cyclohexene-1,2-dicarboximide;
2,4-dichloro-6-(o-chloroaniline)-s-triazine;
bis(4-chlorophenyl)-3-pyridylmethanol;
3,3'-ethylenebis(tetrahydro-4,6-dimethyl-2H-1,3,5-thiodiazine-2-thione);
triphenyltin hydroxide;
1,4-dichloro-2,5-dimethoxy benzene;
triphenyltin acetate;
metal (e.g. iron, sodium and zinc), ammonium and amine salts of dialkyl dithiocarbamic acids (or example, ziram or ferbam);
2,6-dichloro-4-nitroaniline;
tetrachloronitroanisole;
hexachlorobenzene;
hexachlorophene;
methylmercury nitrile;
tetrachloroquinone;
2,3-dichloro-1,4-naphthoquinone;
cupric hydroxide;
tribasic copper sulfate;
fixed copper;
sulfur;
1,2-dibromo-3-chloropropene;
1,2-dibromo-3-chloropropane;
dichloropropane-dichloropropene mixture;
ethylene dibromide;
chloropicrin;
sodium monomethyl dithiocarbamate (SMDC);
tetrachloroisophthalonitrile;
Streptomycin Kasugamycin or other antibiotics;
2-(2,4,5-trichlorophenoxy)propionic acid;
p-chlorophenoxyacetic acid;
1-napthalene acetamide; and
N-(1-naphthyl)acetamide.

The agricultural chemicals listed above are merely exemplary of the compounds which can be mixed with the active compounds and are not intended to any way limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

The following examples illustrate the activity of the compounds of Formula I. All parts are parts by weight unless otherwise indicated.

EXAMPLE 3

| | Percent |
|---|---|
| Methyl 1-(trichloromethylthio) - 2 - benzimidazole-carbamate | 50 |
| Dioctyl sodium sulfosuccinate ("Aerosol" OTB) | 3 |
| Low viscosity methylcellulose ("Methocel" 15) | 0.5 |
| Sucrose (commercial cane sugar) | 46.5 |

The above compounds are blended and hammer-milled, then air-milled until the active component is substantially all below 5 microns.

The wettable powder thus prepared is added to water at the rate of 500 p.p.m. of the active ingredient. This suspension is used to spray, to the point of run-off, alternate trees in a field planting of apples. Sprays are applied at weekly intervals from Apr. 25 until June 6. From June 6 until the end of the season, the sprays are applied at intervals of two weeks. The remaining trees in the planting are left unsprayed.

In early September all trees are carefully examined. Trees that were sprayed with the compound of this invention are healthy and free of mite infestation and fungus damage. The fruit on the sprayed trees is unblemished and of good size. The foliage of the unsprayed trees, on the other hand, is heavily infested with the apple scab fungus (*Venturia inaequalis*) and the powdery mildew fungus (*Podosphaera leucotricha*). Also the leaves of the unsprayed plants are badly infested with European Red mites (*Panonychus ulmi*). The fruit on the unsprayed trees is spotted with scab and of small size.

Any of the compounds named in Examples 1 and 2 may be formulated as described in this example and when used as indicated give similar results.

EXAMPLE 4

The following formulation is prepared by intimately blending the following ingredients and micropulvering them until the particles are substantially all below 20 microns.

| | Percent |
|---|---|
| Methyl-1-(trichloromethylthio) - 2 - benzimidazole-carbamate | 50.0 |
| Oleic acid ester of sodium isethionate | 2.0 |
| Sodium lauryl sulfate | 1.0 |
| Synthetic fine silica | 47.0 |

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis*. Due to the feeding of the mites, the foliage is russeted and drops permaturely. Also, the untreated trees have poor twig growth and small, spotted fruit. The trees sprayed with methyl 1 - (trichloromethylthio)-2-benzimidazole-carbamate are essentially free of mites, their eggs and apple scab. As a result of the excellent mite control, the sprayed trees have foliage of a thrifty, dark green color, and they exhibit good twig growth and fruit size.

EXAMPLE 5

The following formulation is prepared by intimately blending the ingredients and grinding the blend in an air attrition mill until the particle size is substantially less than 5 microns and then reblending.

| | Percent |
|---|---|
| Sec - butyl - 1 - (trichloromethylthio)-2-benzimadozolecarbamate | 85.0 |
| Alkylnaphthalene sulfonic acid, sodium salt | 1.5 |
| Sodium N-methyl-N-oleoyl taurate | 2.0 |
| Synthetic fine silica | 11.5 |

Four similar potted bean plants (one plant per pot) are selected. The soil in two of these pots is drenched with a water suspension of the wettable powder formulation described above at a rate to provide 30 parts per million by weight in the total amount of soil in the pot. The remaining two pots are left untreated.

Five days after treatment 50 adult mites (*Tetranychus telarius*) are placed on a terminal leaf on each of the test plants. Twenty-four hours later these adult mites, all still alive, are transferred to untreated bean foliage. After another twenty-four hours all of the adult mites are removed in a way which causes no damage to the eggs that have been laid during the twenty-four hour period on the untreated foliage.

A sufficient time is allowed for all viable eggs to hatch. Counts demonstrate that few of the eggs hatch from among those laid by mites that had fed on foliage from pots with soil containing the compound of this invention. Hatch to provide living young was complete, on the other hand, among eggs laid by mites similar handled except that the plants providing sustenance were not in contact with a compound of this invention. This experiment demonstrates systemic movement in plants and mite ovicide effect.

EXAMPLE 6

A dust concentrate is prepared as follows:

| | Percent |
|---|---|
| Methyl 1-(trichloromethylthio) - 2 - benzimidazole-carbamate | 50 |
| Sucrose (commercial cane sugar) | 50 |

The above ingredients are blended and milled to a particle size below 10 microns, followed by reblending.

A dilute dust is then prepared by blending 16 parts of the above mixture with 84 parts of ground phosphate rock.

A uniform cherry orchard in Michigan is selected for the test. Alternate trees are dusted every 14 days at the rate of 910 grams per tree with the above fungicidal dust formulation. The remaining trees are left unprotected. On September 1 the trees are examined. The trees that had been dusted with the compound of this invention are green and healthy, with all leaves remaining on the tree. At this time the foliage of the unprotected trees is largely discolored due to attack by the leaf spot fungus (*Cocomyces hiemalis*) and the two-spotted mite (*Tetranyehus telarius*). Further, much of the foliage of the unprotected trees has fallen due to the effect of the two pests.

EXAMPLE 7

The following ingredients are converted into a dust as indicated:

| | Percent |
|---|---|
| Sec - butyl - 1 - (trichloromethylthio)-2-benzimidazole-carbamate | 20 |
| Pyrophyllite | 79 |
| Alkylnaphthalene sulfonic acid, sodium salt | 1 |

Equal parts of the active ingredient and the diluent are milled with the surfactant and then diluted with the remaining pyrophyllite in a ribbon blender. The components are then blended until they are homogeneous.

Cotton plants in selected plots are thoroughly dusted at a rate of 10 kilograms of dust per hectare for each application on June 20 and at two-week intervals thereafter until mid-August with the above dust formulation in addition to a regular insecticidal program. Similar plots receive the insecticidal application only. By late August the plots receiving the insecticide only have a high incidence of boll rot caused by *Aspergillus niger* and high populations of spider mites, *Tetranychus spp.*, which cause the leaves of the cotton plants to turn rusty brown, twist and drop to the ground. Many bolls are completely rotted and loss of leaves results in the shedding of small bolls and prevents the lint from becoming fully developed. Cotton plants treated with the above dust formulation retain healthy foliage and produce a heavy crop of healthy full-sized bolls.

EXAMPLE 8

A granular formulation is prepared as follows:

| | Percent |
|---|---|
| Granular corn cob (15–30 mesh, i.e. approx. 0.59–1.3 mm.) | 90 |
| Methyl 1-(trichloromethylthio) - 2 - benzimidazolecarbamate | 10 |

The active compound is dissolved in warm chloroform and the chloroform solution is sprayed on the granular corn cob which is being tumbled in a mixer. Evaporation of the chloroform yields a finished granule in which the active ingredient is absorbed.

A field in California is seeded with cotton in the normal manner, except that granules prepared as set forth above are added to alternate rows. These granules are dropped in such a way that some fall into the furrow and some are mixed with the covering soil. The rate of granule application is such as to employ 0.45 kilogram of active chemical of this invention per 3,600 meter of row. The remaining rows are untreated.

Six weeks after planting, many of the plants in the rows without the granules are dead, and others show soreshin lesions caused by *Rhizoctonia solani* as well as heavy populations of the Pacific mite (*Tetranychus pacificus*). In the rows that had received the granules, all plants remain alive and are healthy, and further they are free of mites. The effect on mites is clearly systemic.

EXAMPLE 9

A wettable powder formulation is prepared from the following ingredients in the proportions given:

| | Percent |
|---|---|
| Methyl - 1 - (trichloromethylthio) - 2 - benzimidazolecarbamate | 25 |
| Methyl O-(methylcarbamyl)thiolacetohydroxamate | 10 |
| Oleic acid ester of sodium isethionate | 2 |
| Sodium lauryl sulfate | 2 |
| Diatomaceous silica | 61 |

All ingredients are combined and rotated in a blender until uniformly admixed. The total mix is then air-milled to produce particles most of which are less than 10 microns in particle size.

A sufficient amount of the above wettable powder is added to water such that there are 2.5 grams per liter of water of the methyl O - (methylcarbamoyl)thioacetohydroxamate. The resulting suspension is then sprayed at weekly intervals on one of a pair of similar, adjacent plots in a greenbean field in Florida at the rate of two kilograms of methyl 1 - (trichloromethylthio) - 2 - benzimidazolecarbamate per hectare. The test area is selected as one in which there is a high infestation of the two-spotted mite, *Tetranychus bimaculatus*, and the Mexican bean beetle. *Epilachna varivestis*. The plot sprayed with the above formulation remains free of both the two-spotted mite and the Mexican bean beetle for the entire growing season and provides a good yield of greenbeans. The unsprayed plot is attacked by both of the above pests and is damaged to the extent that the yield is greatly reduced. Similar areas sprayed with methyl O-(methylcarbamyl)thiolacetohyroxamate alone are free from attack by the Mexican bean beetle but are damaged by the two-spotted mite.

In the above example methyl O-(carbamyl)thiolacetohydroxamate or S - methyl 1 - dimethylcarbamoyl - N - [(methylcarbamoyl)oxy]thioformimidate may be substituted for methyl O-(methylcarbamyl)thiolacetohydroxamate with essentially equivalent results.

EXAMPLE 10

A wettable powder formulation is prepared from the following ingredients in the proportions given:

| | Percent |
|---|---|
| Methyl 1-(trichloromethylthio) - 2 - benzimidazolecarbamate | 30.0 |
| Methoxychlor | 30.0 |
| Sodium lauryl sulfate | 1.0 |
| Oleic acid ester of sodium isethionate | 2.0 |
| Non-swelling montmorillonite clay | 37.0 |

All of the ingredients are combined and rotated in a blender until uniformly mixed. The total mix is then air-milled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermudagrass turf area in Florida. The area selected for the test is heavily infested with a plant-feeding mite, *Aceria neocynodomis*, and chinch bugs, *Blissus leucopterus insularis*. The chinch bugs are killed in the treated plot and the mite infestation soon disappears. The turf quickly returns to a healthy and attractive condition.

In a similar untreated plot both the mites and the chinch bugs continue to multiply and, by their feeding, the Bermudagrass becomes discolored and the turf reflects many unsightly dead spots. Similar plots sprayed with methoxychlor only are free of damage due to chinch bugs but are injured by the high mite infestation.

EXAMPLE 11

| | Percent |
|---|---|
| Methyl 1-(trichloromethylthio) - 2 - benzimidazolecarbamate | 30.0 |
| Thiram | 30.0 |
| Dioctyl sodium sulfosuccinate ("Aerosol" OTB) | 3.0 |
| Low viscosity methyl cellulose ("Methocel" 15) | 0.5 |
| Carbon black | 1.0 |
| Sucrose (commercial cane sugar) | 35.5 |

The ingredients are blended and the mixture is first hammer-milled, then air-milled twice, until the active ingredient is present in particles substantially all of which are smaller than 5 microns.

The mixture of fungicides described above is diluted in a spray tank to a concentration of 1,000 p.p.m. of combined active ingredients. It is sprayed to run off on apple trees in a portion of an orchard every two weeks during the growing season. At harvest, the treated trees are healthy and producing an abundance of normal fruit. The untreated trees, on the other hand, are partly defoliated by apple scab (*Venturia inaequalis*), cedar apple rust (*Gymosporangium juniperivirginianae*) and powdery mildew (*Podosphaera leucotricha*). The fruit on the untreated trees is scabby, distorted with rust lesions and unmarketable due to the attack of these fungus pathogens. The degree of protection from this complex of serious diseases by the treatments with the above mixture is outstanding.

EXAMPLE 12

A wettable powder is prepared by the methods shown in Example 3:

| | Percent |
|---|---|
| Methyl 1 - (trichloromethylthio) - 2 - benzimidazolecarbamate | 60 |
| Alkylnaphthalene sulfonate, sodium salt ("Alkanol" B) | 5 |
| Polyvinylpyrrolidone derivative ("Ganex" 904) | 1 |
| Cane sugar | 34 |

A wettable powder is prepared by blending and hammer-milling the following ingredients:

| | Percent |
|---|---|
| Maneb | 60 |
| Alkylnaphthalene sulfonate, sodium salt ("Alkanol" B) | 5 |
| Polyvinylpyrrolidone derivative ("Ganex" 904) | 1 |
| Cane Sugar | 34 |

Equal portions of these two powders are combined, blended, and hammer-milled to produce a powder containing 30% each of the two fungicides.

The wettable powder is suspended in water at a rate to obtain 1000 p.p.m. of the combined active ingredients. This mixture is sprayed to run-off on a single row of grape vines on a weekly schedule during the growing season. At harvest the treated vines and grapes are healthy and producing an abundance of normal fruit. The untreated plants in adjacent rows, on the other hand, are severely injured by downy mildew incited by *Plasmopara viticola*, powdery mildew incited by *Uncinula necator* and gray mold incited by *Botrytis cinerea*.

EXAMPLE 13

| | Percent |
|---|---|
| Methyl 1-(2,4-dinitrophenylthio)-2-benzimidazolecarbamate | 60 |
| Dioctyl sodium sulfosuccinate | 3 |
| Low viscosity methylcellulose | 0.5 |
| Sulfur (sublimed) | 36.5 |

The above composition is blended, hammer-milled, and air-milled in the same manner as previous examples.

Test plots are established in a rice field. The plots are sprayed with water containing a suspension of the wettable powder described above along with a polyhydric alcohol ester surface active agent ("Trem" 014). The amount of the wettable powder used is such as to provide 1.5 grams of the active compound of this invention per liter of water. The amount of "Trem" 014 is 400 p.p.m. in the final spray. The spray is applied at weekly intervals at the rate of 900 liters per hectare. The remainder of the field is left unsprayed. Three months after the start of the test, the sprayed plots are healthy and growing well. The untreated plots on the other hand, are seriously damaged by the rice blast fungus, *Piricularia oryzae* which greatly reduces yield.

EXAMPLE 14

A dust formulation is prepared from the following ingredients in the proportions listed:

| | Percent |
|---|---|
| sec-Butyl 1-(trichloromethylthio)R-2-benzimidazolecarbamate | 5 |
| Methoxychlor | 5 |
| Sodium alkylnaphthalenesulfate | 1 |
| Pyrophyllite clay | 89 |

The above ingredients are combined and rotated in a blender until uniformly mixed. The composition is then air-milled to produce particles essentially less than 50 microns in diameter. The above-prepared dust is then applied to a special planting of tea roses. The planting consists of uniform plots each with three varieties of rose. The test period extends from June 1 through Aug. 31. At the end of the test period the roses in all unprotected plots are seriously damaged by the spider mite, *Tetranychus telarius*, the rose blockspot, *Diplocarpon rosae*, and the Japanese beetle, *Popillia japonica*. Randomly selected plots dusted at weekly intervals with the above prepared composition to the extent that thorough coverage of the plant is obtained with the formulation, remain free from damage, and produce good yields of bloom throughout the test period.

Plots treated with a dust containing methoxychlor, but without the sec-butyl 1-(trichloromethylthio)-2-benzimidazolecarbamate show no Japanese beetle injury. However, they are seriously damaged by mites and blackspot.

I claim:

1. A compound of the formula:

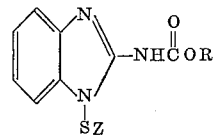

wherein

R is methyl, ethyl, isopropyl or sec-butyl; and
Z is alkyl of 1 through 3 carbon atoms; alkyl of 1 through 3 carbon atoms substituted with chlorine; phenyl; phenyl substituted with methyl, nitro, or chlorine; benzyl; or benzyl substituted with methyl, nitro or chlorine.

2. A compound of the formula:

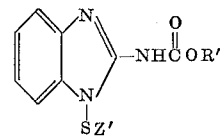

wherein

R' is methyl, ethyl or isopropyl; and
Z' is trichloromethyl or 2,4-dinitrophenyl.

3. Methyl - 1 - (trichloromethylthio) - 2 - benzimidazolecarbamate.
4. Ethyl - 1 - (trichloromethylthio) - 2 - benzimidazolecarbamate.
5. Methyl - 1-(2,4-dinitrophenylthio)-2-benzimidazolecarbamate.
6. Ethyl - 1 - (2,4-initrophenylthio)-2-benzimidazolecarbamate.

References Cited

UNITED STATES PATENTS

| 2,933,502 | 4/1960 | Klopping | 260—309.2 |
| 2,933,504 | 4/1960 | Klopping | 260—309.2 |
| 3,010,968 | 11/1961 | Loux | 260—309.2 |
| 3,369,027 | 2/1968 | Klauke et al. | 260—309.2 |

FOREIGN PATENTS

| 666,795 | 1/1966 | Belgium | 260—309.2 |

OTHER REFERENCES

Ridi et al.: Chem. Abst., vol. 49, columns 4658–9 (1955), QD1.A51.

NATALE TROUSOF, Primary Examiner

U.S. Cl. X.R.

424—273